United States Patent [19]

Dann

[11] Patent Number: 4,991,079
[45] Date of Patent: Feb. 5, 1991

[54] REAL-TIME DATA PROCESSING SYSTEM

[75] Inventor: James C. Dann, Caterham, United Kingdom

[73] Assignee: Encore Computer Corporation, Marlborough, Mass.

[21] Appl. No.: 401,511

[22] Filed: Aug. 30, 1989

Related U.S. Application Data

[63] Continuation of Ser. No. 710,229, Mar. 11, 1985, abandoned.

[30] Foreign Application Priority Data

Mar. 10, 1984 [GB] United Kingdom ............... 8406322
Aug. 14, 1984 [GB] United Kingdom ............... 8420617

[51] Int. Cl.$^5$ ............................................. G06F 13/00
[52] U.S. Cl. ................................. 364/200; 364/228.1; 364/245.7; 364/229.2
[58] Field of Search ... 364/200 MS File, 900 MS File

[56] References Cited

U.S. PATENT DOCUMENTS

| | | | |
|---|---|---|---|
| 3,618,045 | 11/1971 | Campbell et al. | 364/200 |
| 3,845,474 | 10/1974 | Lange et al. | 364/200 |
| 3,873,819 | 3/1975 | Greenwald | 235/153 |
| 3,889,237 | 6/1975 | Alferness et al. | 364/200 |
| 3,940,743 | 2/1976 | Fitzgerald | 364/200 |
| 4,007,450 | 2/1977 | Haibt et al. | 364/200 |
| 4,056,844 | 11/1977 | Izumi | 364/200 |
| 4,209,839 | 6/1980 | Bederman | 364/200 |
| 4,212,057 | 7/1980 | Devlin et al. | 364/200 |
| 4,228,496 | 10/1980 | Katzman et al. | 364/200 |
| 4,253,146 | 2/1981 | Bellamy et al. | 364/200 |
| 4,335,426 | 6/1982 | Maxwell et al. | 364/200 |
| 4,351,025 | 9/1982 | Hall, Jr. | 364/200 |
| 4,394,731 | 7/1983 | Flusche et al. | 364/200 |
| 4,442,487 | 4/1984 | Fletcher et al. | 364/200 |
| 4,527,238 | 7/1985 | Ryan et al. | 364/200 |
| 4,539,637 | 9/1985 | DeBruler | 364/200 |
| 4,642,755 | 2/1987 | Hinch | 364/200 |
| 4,669,043 | 5/1987 | Kaplinsky | 364/200 |

FOREIGN PATENT DOCUMENTS 0092895 11/1983 European Pat. Off. .
0251686 1/1988 European Pat. Off. .

OTHER PUBLICATIONS

Frank, "Tightly Coupled Multiprocessor System Speeds Memory-Access Times", *Electronics International*, vol. 57 (1984), Jan., No. 1, pp. 164–169.
Dixon, "Group Address Structure for Network Service Nodes", *IBM Technical Disclosure Bulletin*, vol. 26, No. 3A, Aug. 1983, pp. 1198–1200.

*Primary Examiner*—Thomas M. Heckler
*Attorney, Agent, or Firm*—Fleit, Jacobson, Cohn, Price, Holman & Stern

[57] ABSTRACT

A real time data processing system in which each of a series of processing nodes is provided with its own data store partitioned into a first section reserved for the storage of data local to the respective node and a second section reserved for the storage of data to be shared between nodes. The nodes are interconnected by a data link and whenever a node writes to an address in the second section of a data store the written data is communicated to all of the nodes via the data link. The data in each address of the second sections of the data stores can be changed only by one respective processing node which acts as a master for that address. As each address containing shared data can only be written to by one node collisions between different nodes attempting to change a common item of data cannot occur.

46 Claims, 7 Drawing Sheets

FIG. 1 "PRIOR ART"

REAL-TIME DATA PROCESSING SYSTEM

This application is a continuation of application Ser. No. 710,229, filed 3-11-85.

The present invention relates to data processing systems including two or more data processing units each having access to the same data. Each data processing unit may be a substantially independent computer, or may interact with one or more of the other processing units. Data processing units of either type are referred to below as "nodes", and data to which two or more nodes have access is referred to below as "shared data".

In one known system used in for example flight simulators, shared data is held in a common data store, accessible to two or more nodes. Each node may also have its own local store for holding data to which only that node has access. A problem with such a system is that the nodes must compete for access to the shared store and hence there may be conflict between two or more nodes each attempting simultaneously to access the same item of shared data in the common store. Moreover, there are significant transmission delays between the shared store and relatively distant nodes. As a result, access to the shared data may be very slow.

U.S. Pat. No. 3,889,237 describes a two node system in which each node receives in its own local store a duplicate copy of the shared data. To ensure that both copies are kept consistent, each node has direct access to the local store of the other node so that it can write a new value of the shared data into both stores simultaneously. A problem with this prior proposal is that conflict arises between the nodes if both attempt to access the same item of shared data at the same time, and each node must wait for all writes to the shared data portions of the local stores to be completed before it can continue processing. This seriously reduces the efficiency of the system. This makes it very difficult to extend this proposal to more than two nodes.

European Patent Specification No. 0 092 895 describes another system in which each node has its own local store in which shared data is stored. The nodes are interconnected by a data transmission link and whenever one node writes to an address containing shared data in its local store it also generates a message containing the write data and the address. The message is applied to the link and the other nodes use the write data to update the appropriate shared data address in their local stores. Each node continues processing after writing to a shared data address and does not wait for the write data message to reach the other nodes. The link is organised as a token ring, there being only one token so that only one message can be on the ring at any one time. Thus each node receives messages in the same sequence, thereby establishing a chronological order for the messages even though the individual nodes are operating asynchronously. However, if a first node receives a write data message from a second node while the first node still has an outstanding write data message to transmit, the received message may overwrite the data address which has already been written to by the second node. The data address would then be overwritten by a chronologically earlier value and the data stored in the shared data stores of the various nodes would not be consistent. To prevent this happening, the processor of the second node is suspended pending clearance of the outstanding message or messages. Suspension of the processors obviously slows down the systems operation and where there is a heavy traffic of messages this is a serious problem.

In real-time computing systems, such as those used for flight training simulators, the speed at which the system operates is of fundamental importance. It is known to provide real-time systems in which a series of nodes each performs a particular function but within a time-framework imposed by a system control computer. Examples of such systems are described in U.S. Pat. Nos. 4,414,624 and 4,351,025.

In U.S. Pat. No. 4,414,624, the operations of the nodes are scheduled by the control computer according to the processing required. At the beginning of each frame a time control word is transmitted to each node to establish the time available for processing. Each node has a local store for shared data and each node can globally write to any or all the local stores of the other nodes simultaneously. All data is first written to a common store and then the required data is read out to the local stores from the common store. Thus each update of an item of data in a local store requires both a write to the common store step and a read to the local store step. This slows down the operating speed of the system.

In U.S. Pat. No. 4,351,025, real-time operation of the nodes and the system control computer are interleaved without overlap, write data from the nodes being distributed during the operating time segment of the system control computer. This arrangement is relatively easy to implement but relatively slow in operation as the two parts of the system operate alternately, not continuously.

Thus, in the prior art systems, including real-time systems, a rigid operating protocol is established to maintain the coherence of the shared data in the separate local stores. This rigid protocol inevitably restricts the speed and flexibility of the systems.

It is an object of the present invention to obviate or mitigate the above problems.

According to the present invention, there is provided a real-time data processing system comprising at least two processing nodes, a data store in respect of each node, each data store being partitioned into sections a first one of which is reserved for the storage of data local to the respective node and a second one of which is reserved for the storage of data to be shared between nodes, a data link interconnecting the nodes, means at each node for generating a write message comprising an address and data to be written to that address whenever that node writes to an address in the second section of a data store, means for transmitting each generated message via the data link to each of the nodes, means for allocating to each address in the second sections of the data stores a respective node which is to be the master node for that address, and means for preventing data being written to any address in the second section of a data store other than by the allocated master node.

As each address of the data stores which contains data shared between the nodes can be written to by only one node processor it is not necessary to impose rigid controls on the priority allocated to write messages to ensure that the shared data does not become corrupt. This enables the speed of operation of the system to be enhanced, but in addition it enables a relatively large number of nodes to be run in parallel using standard processing units without complex operating procedures. Thus a wide range of different real-time system requirements can be met relatively easily. For example, the present invention has applications in flight and other simulators, process control systems, and fire control systems.

Preferably an address range comparator is provided in respect of each node for comparing the address of a data write message generated by that node with a preset range of addresses and for transferring the data write message to the data link only if the compared address is within the preset range. Thus the address comparator effectively determines which addresses in the shared data can be written to by the respective nodes. A further address comparator can be provided in respect of each node for comparing the address of a data write message received from the data link with a preset range of addresses and for transferring the received data write message to the local data store only if the compared address is within the preset range of addresses. Thus the further address comparator determines the addresses within a local store to which data can be written from the date link.

The nodes can be connected in parallel by a single data link or in parallel by a plurality of data links. Furthermore more complex system structures can be provided. For example the nodes can be arranged in a plurality of groups with the nodes in each group being connected in parallel by a respective data link and at least one of the nodes belonging to two of the groups. In this arrangement the section of the data store receiving shared data at the node belonging to two groups is divided into a plurality of subsections each of which receives data to be shared with the nodes of a respective group. Software is provided to control the transfer of data from one subsection to the other when data is to be shared between two groups of nodes.

Preferably a further memory is provided connected to the data link to which input/output data can be written by the nodes. Addresses dedicated to this purpose would be provided in the local data stores of the nodes from which data can be read and to which data can be written via the data link.

Embodiments of the present invention will now be described, by way of example, with reference to the accompanying drawings, in which.

Figure 2:
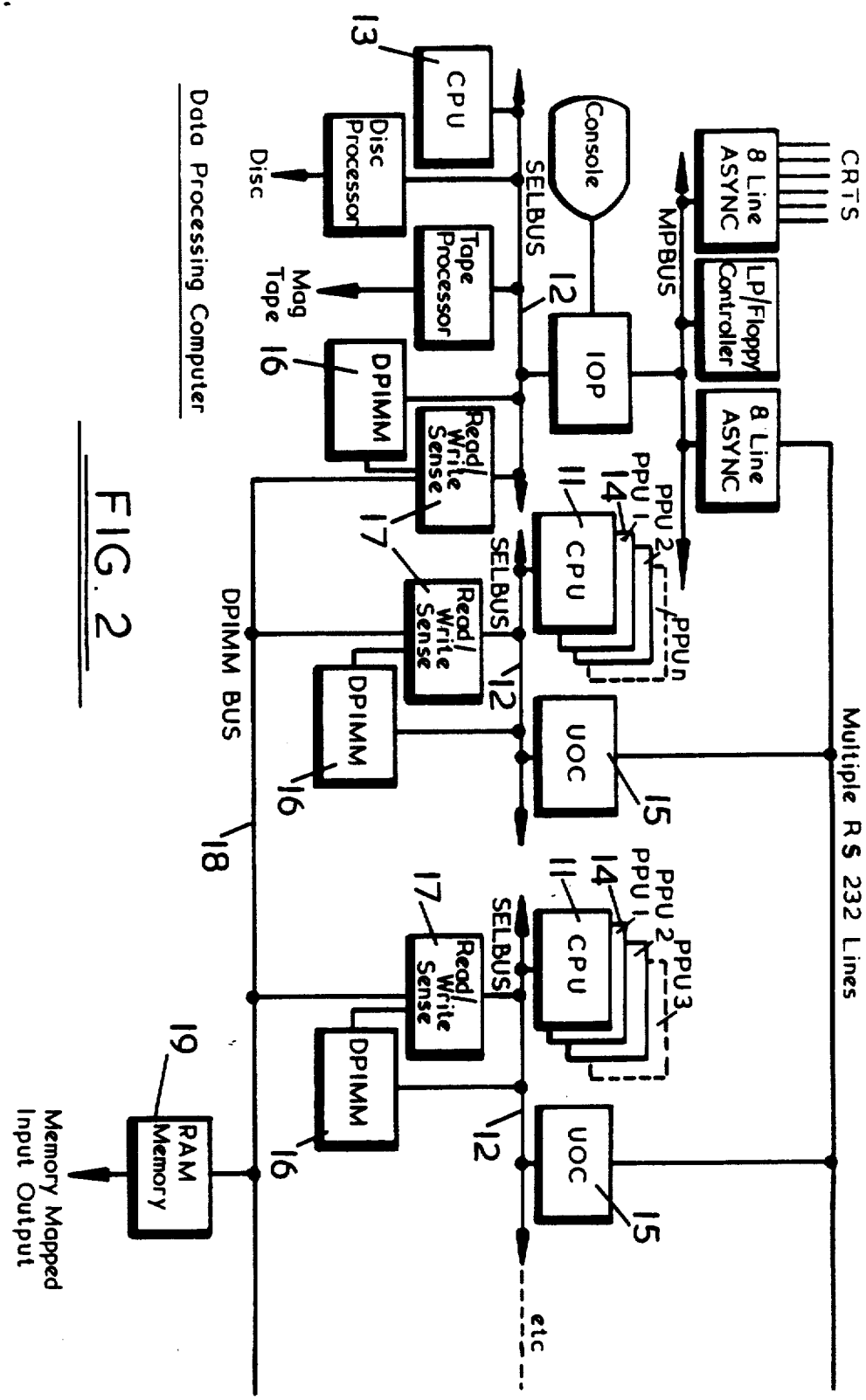
FIG. 2 is a block schematic diagram of an embodiment of the present invention.
Figure 3:
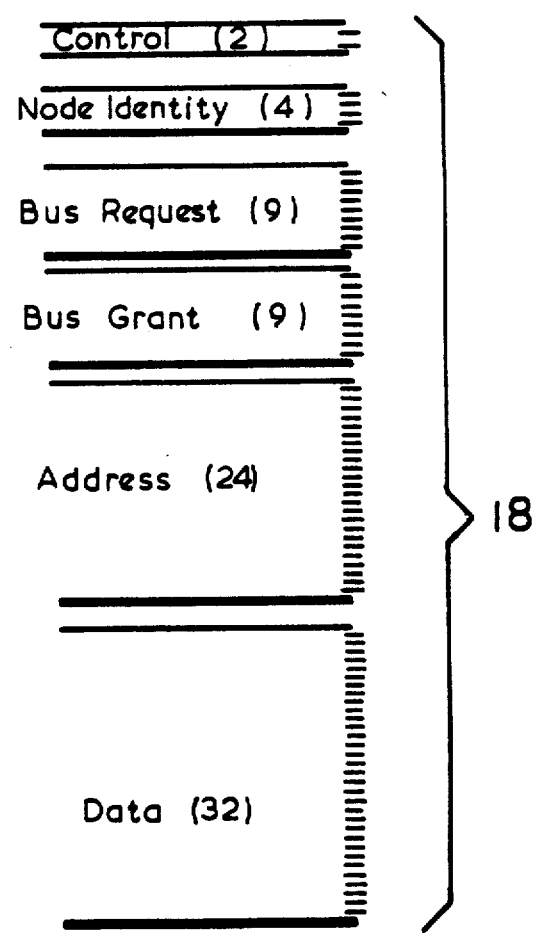
Figure 4:
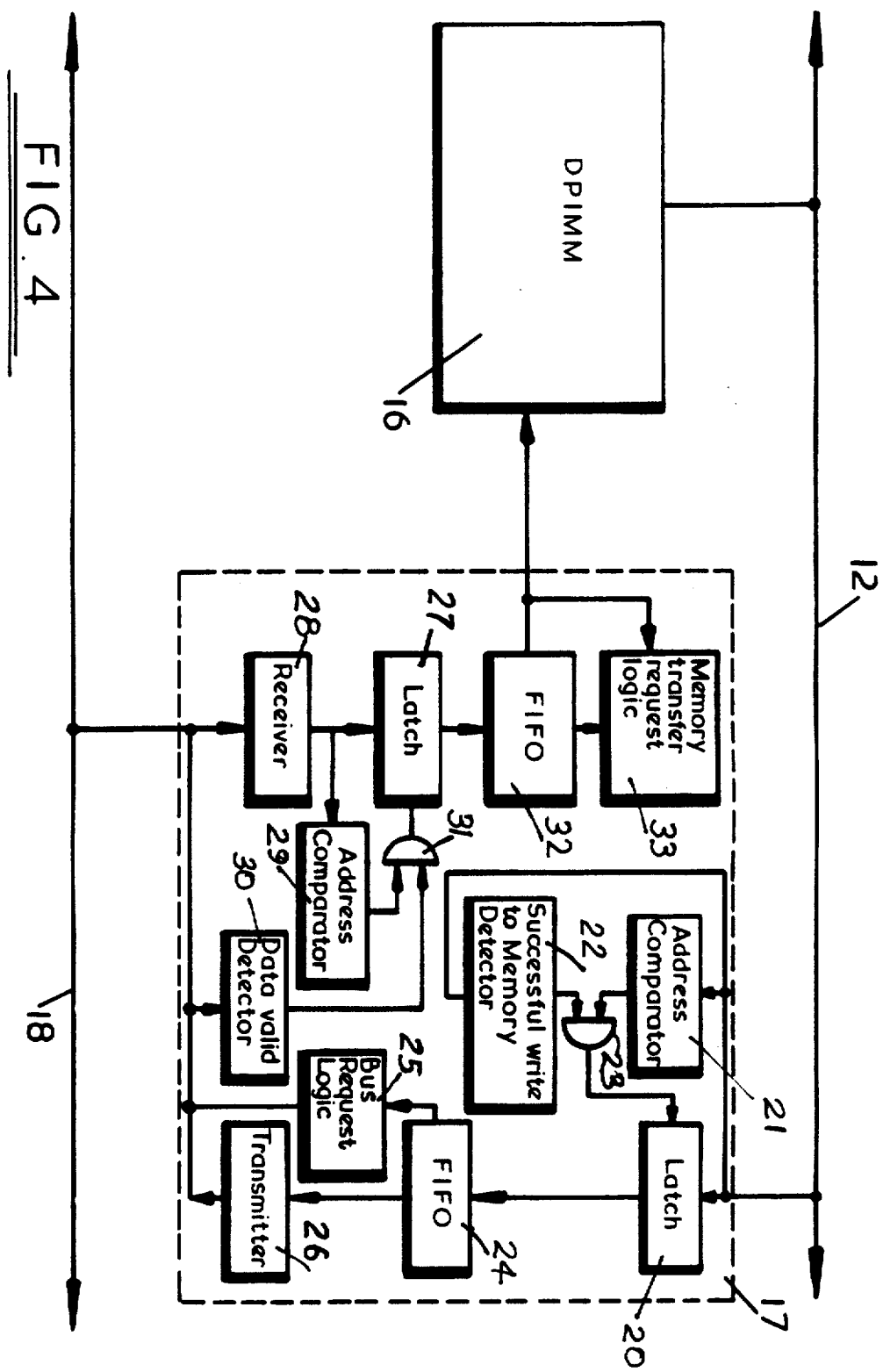

FIG. 3 schematically illustrates the lines provided on a data bus shown in FIG. 2;

FIG. 4 is a block schematic diagram of read/write sense hardware shown in FIG. 2; and FIGS. 5, 6, 7, 8 and 9 schematically illustrate alternative structures for systems embodying the present invention.

Figure 1:
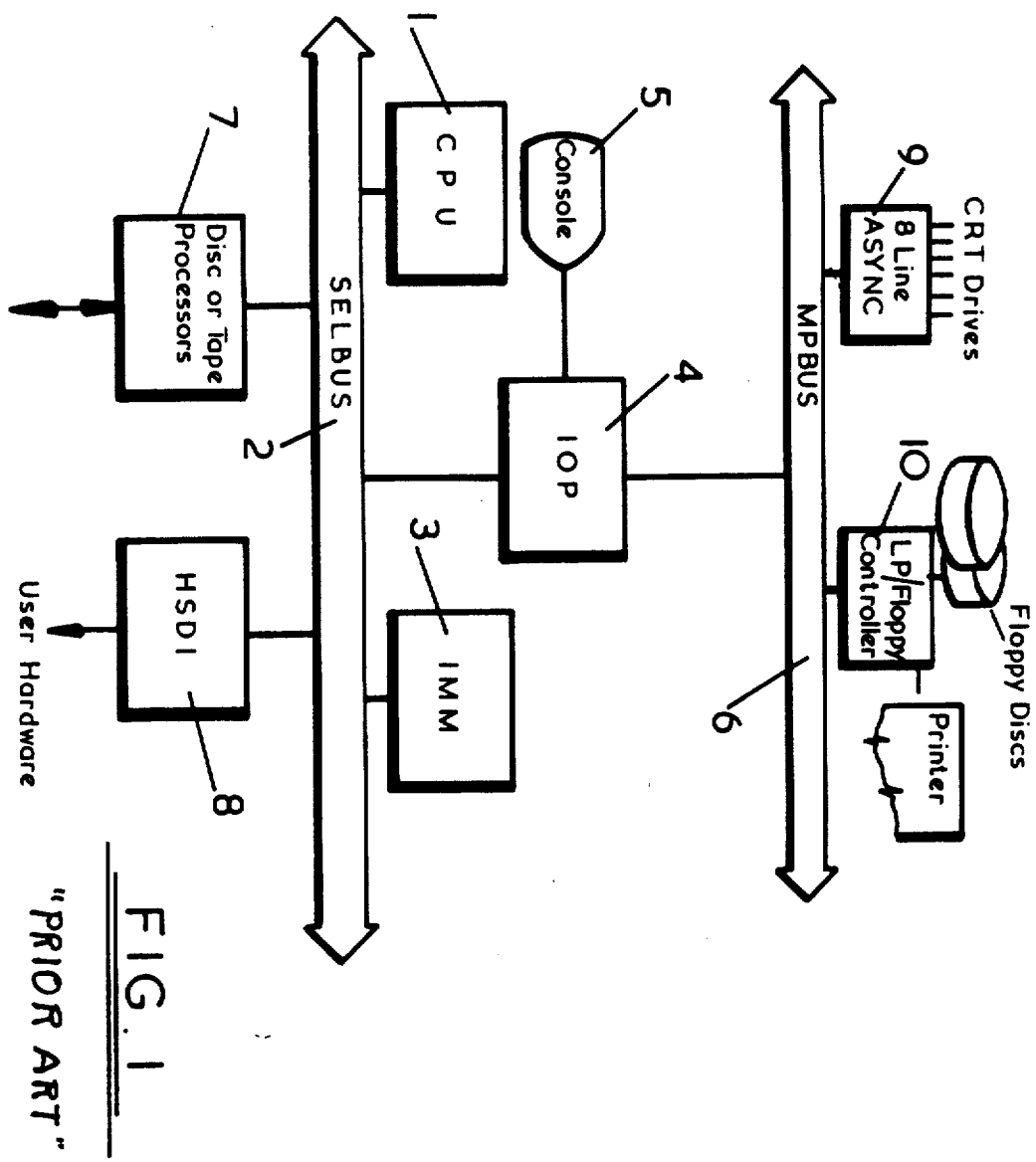
FIG. 1 is a block schematic diagram of a known data processing system.

Referring to FIG. 1, the illustrated known system is a commercially available system based on the GOULD Computer Systems Division 32/27 computer. A central processor unit (CPU) 1 resides on a 26.6 MB/Sec computer bus 2 known as a "SELBUS" which is the main fast communication bus. A data store in the form of an Integrated Memory Module (IMM) 3 provides 1 MB of memory and associated memory control logic. An IOP unit 4 is a controller which supports a system console 5 and is the master controller for a 1 MB/Sec Multi Purpose Bus (MPBUS) 6.

High speed devices such as Disc or Tape controllers 7 and high speed device interface (HSDI) 8 connect to the SELBUS 2. Low speed peripherals such as CRT terminal controllers 9 (8 line asynchronous operation), line printer/floppy disc controllers 10, etc. connect to the MPBUS 6. The terms "SELBUS", "IMM", "IOP", "MPBUS", "IPU" and "HSDI" are those used by the manufacturer to describe elements of the known GOULD 32/27 computer system and different nomenclature may be used by other manufacturers for equivalent components. The GOULD nomenclature is used herein simply for the sake of convenience.

A system according to the invention is illustrated in FIG. 2. The illustrated system comprises a series of processing units 11 each based on a GOULD 32/27 computer. Each processing unit 11 has its own SELBUS 12 and operates asynchronously of the others. The processing units 11 do not drive peripherals, but are connected to a further processing unit 13 which is provided with a full complement of support peripherals. Each of the processing units 11 handles processing relating to a particular aspect of the system, for example in a flight simulator system one unit 11 would calculate flight parameters, e.g. altitude, one unit 11 would calculate engine parameters, e.g. thrust, another unit 11 would calculate autopilot parameters, and so on. Each processing unit 11, 13 and its associated equipment such as data stores constitutes a node of the system.

As the computing nodes incorporating processing units 11 do not drive peripherals the required input/output capacity of these nodes is limited, all slow input/output operations being executed by the front end processing unit 13. This maximises the available real time computing power of each computing node. A secondary RS 232 channel (multiple RS 232 lines) provides for initialisation and control functions, and also aids diagnostics if the system fails.

Each CPU 11 is augmented by a number of physically similar Parallel Processor Units (PPU) 14. Each PPU 14 is similar to the GOULD Internal Processor Unit (IPU) featured on the 32/67, 32/77 and 32/87 GOULD computers but extended in accordance with conventional techniques to allow for more than two 32/27 processors per SELBUS 12.

An Unattended Operators Console (UOC) 15 is associated with each unit 11. The UOC 15 is essentially an IOP (FIG. 1.) with extra logic to obviate the need for an MPBUS as normally provided when peripherals are to be driven.

The SELBUS 12 of each CPU 11, 13 is connected by a DPIMM 16 (a dual port IMM) and read/write sense logic 17 to a 26.6MB/Sec data link 18 or reflected memory bus. The DPIMM 16 is available from GOULD and is normally arranged with the second port connected to peripheral equipment, i.e. for input/output purposes. In the illustrated arrangement however, the DPIMM 16 is used to enable the provision of a "reflective memory" system in accordance with the invention.

The principle of the illustrated reflective memory system is that each DPIMM data store 16, which contains 2 MB of memory, is logically partitioned at a predetermined point. All data and program on one side of the predetermined point is local to the SELBUS 12 of the unit 11 or 13 on which the DPIMM 16 resides, and all data and program on the other side of that point is shared via the bus 18 with the other units 11, 13. The read/write sense hardware 17 converts the usage of the DPIMM 16 to a local/shared system. The read/write sense logic unit 17 is connected to the second port on each DPIMM 16. If a CPU 13, 11 (or PPU 14) writes to an address in the shared portion of its associated DPIMM 16 this is detected by the read/write sense hardware 17 and the address and data is put on to the reflected memory bus 18. All DPIMM's 16 then automatically accept this data and enter it into their own memory. Thus all DPIMM's 16 have a copy of all of the shared data within their own memories. Each processing unit can thus access data it requires directly from its respective data store (DPIMM 16). Access is never delayed as the result of another processor accessing the same data store.

It is of fundamental importance to prevent "collisions" due to two or more processors trying to manipulate the same data item simultaneously. This is done by the read/write sense logic unit 17 that as described above is used to issue a single write command to each of the other nodes of the system. Each node has its own unique address partition so that only one node is capable of writing data to any one address in the shared data sections of the data stores, the address for an item of data in one data store 16 being the same as the address for that same item of data in all the other data stores 16. Thus although all nodes may be able to write to the shared data sections of all the data stores 16, the only transactions which actually do so are those in which the address to which data is to be written lies within the memory segment for which that system is "master". For example, in a flight simulator comprising a flight processor, only that processor can actually change the stored value for altitude because altitude is within its address limits but outside the address limits of all the other processors. The other processors can read the stored altitude value but cannot change it. Thus numerical discrepancies are avoided without it being necessary to provide complex procedures to maintain the same chronological order for updates to the shared data in the different data stores.

As an additional feature the read/write sense hardware 17 can detect input/output read and write requests to addresses dedicated to input/output data the DPIMM's memory 16. The address represents a location in a RAM memory 19 which is connected to user input/output high speed equipment, e.g. a Flight Simulator Input/Output linkage. This allows fast acquisition of data. (The DPIMM 16 has been used previously for input/output functions, but in block mode transfer, not for individual data element transfer). This type of input/output can be referred to as Memory Mapped input/output.

The handling of communications between the SELBUS 12 of any one node and the reflected memory bus 18 will now be described in greater detail with reference to FIGS. 3 and 4.

The buses 12 and 18 each carry parallel data, address, bus organisation and bus control signals at a rate of 26.6 MB/Sec. This data rate can be maintained for a bus length of forty feet but must be reduced if the bus is longer than this, e.g. to 13.3 MB/Sec for a bus eighty feet long. FIG. 3 schematically illustrates the bus 18, which has thirty two data lines, twenty four address lines, nine bus request lines, nine bus grant lines, four node identity lines, and control lines only two of which are shown as being of relevance to the communication of data via bus 18. There are nine nodes in all, each allocated respective bus request and grant lines, one node comprising CPU 13 and the others each comprising one CPU 11.

FIG. 4 shows in greater detail than FIG. 2 the arrangement of the DPIMM 16 and read/write sense logic 17 connected between bus 12 and bus 18. Assuming that the node processor associated with the arrangement of FIG. 4 writes to the data store 16, the data to be written and its address is loaded into latch 20 and the address to which it is to be written is loaded into an address comparator 21. Assuming that the data is successfully written to the store 16, a "successful write" signal is delivered to a detector 22. The successful write signal will be carried by one of the control lines of the bus 12 in an entirely conventional manner. If the address is not within a predetermined range set by the comparator 21, it relates to local data and is not to be shared with the other nodes. If on the other hand it is within the set range, the comparator provides an output to an AND gate 23. The detector 22 also provides an output to the gate 23 which controls the latch 20 so that the address and data in the latch 20 is loaded into a first in first out (FIFO) register 24 only if the address is within the set range and the successful write signal has been detected.

The FIFO 24 can assemble a queue of up to sixty four messages for transmission although normally there will be only one or two messages in the queue. If a queue of sixty or more messages are assembled a "busy" signal is delivered to the system so as to increase the priority of the respective node when making bus access requests. An appropriate circuit (not shown) is provided to suspend the associated node processor if the FIFO is filled up with messages awaiting transmission.

When the FIFO 24 stores a message for transmission, this is detected by a bus request logic circuit 25 which outputs a bus request signal onto the respective line of bus 18. The bus request signal is transmitted to the CPU 13 (FIG. 2) which controls the operation of the bus 18. The CPU 13 grants access to the nodes which have messages to transmit one at a time in a preset order so that the first message in the queue at each node is transmitted during one cycle of operation of the bus 18, and so on. Thus in due course the bus request logic will receive a "bus grant" signal from the bus 18 and will then cause the message in FIFO 24 to be put onto the bus 18 by a transmitter 26.

Assuming now that the arrangement of FIG. 4 is that of a node receiving the transmitted message, the handling of that message will be described. When the CPU 13 grants a bus request, a clock signal is transmitted on one of the control lines of the bus 18. This clock signal is used to initiate a message transmission and reception cycle. When the message has been transmitted, it is checked for validity by the CPU 13 in accordance with conventional routines, e.g. a parity check, and if the data on the bus is found to be valid a "data valid" signal is transmitted on the other control line of the bus 18. Thus the transmitted message is bracketed by the clock and data valid signals.

The transmitted data and address are loaded into a latch 27 by a receiver 28, and the address is loaded into an address comparator 29. The data valid signal is detected by data valid detector 30. An AND gate 31 has its inputs connected to the comparator 29 and detector 30. A predetermined range of addresses is set in the comparator corresponding to those parts of the data store 16 which can be written to by nodes other than that to which the store 16 is local. If the received address is within the range, and the data valid signal is detected, the gate 31 transfers the message data in latch 27 to a FIFO 32 which stores a queue of up to sixty four messages containing data to be written to the store 16.

When the FIFO 32 has a message to be written to the store 16, a memory transfer request is made to a request logic circuit 33 which communicates with the store 16 and in due course receives a request grant signal from the store 16. The first message in the queue in FIFO 32 is then released to update the appropriate address of store 16.

It may be that a significant number of messages build up in the FIFO's 24 and 32 containing data items which are in due course written to the stores in an order different from the chronological order in which they were generated. However, as each address for shared data can only be written to by its own unique "master" node, and the messages generated by that node are assembled in and transmitted from the FIFO 24 in chronological order, each individual memory address is updated in the correct order. The data in different addresses may get out of chronological step somewhat but in real time interactive systems the rate of change of stored parameters is relatively slow when compared with the iteration rate of the system and therefore this does not present a problem. There is thus no need for the system designer to impose strict procedures to maintain chronology, it being merely necessary to set the address comparators 21 and 29 correctly. The system is therefore very flexible and relatively easy to implement even when; considering very complex real time tasks such as flight simulation.

The four node identity lines (FIG. 3) of bus 18 identify the node originating a message transmitted on the bus. This information is not required to enable data to be handled by the read/write sense logic 17 (FIG. 4) but is provided to enable traffic on the bus 18 to be monitored. Faults and "bottlenecks" on the bus 18 can be more easily detected and dealt with if this extra information is available.

Figure 5:
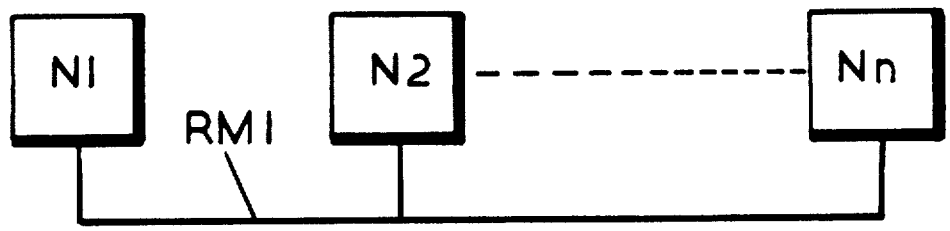
Figure 6:
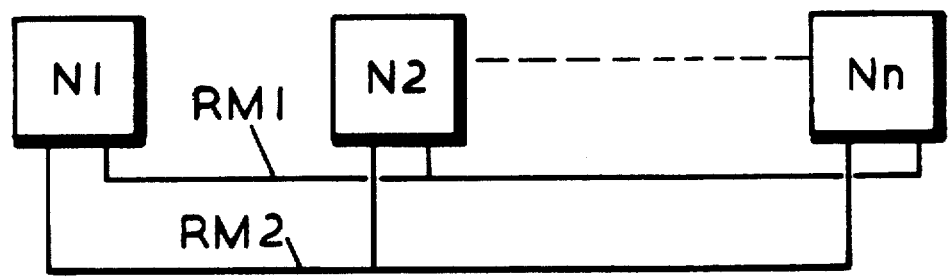
Figure 7:
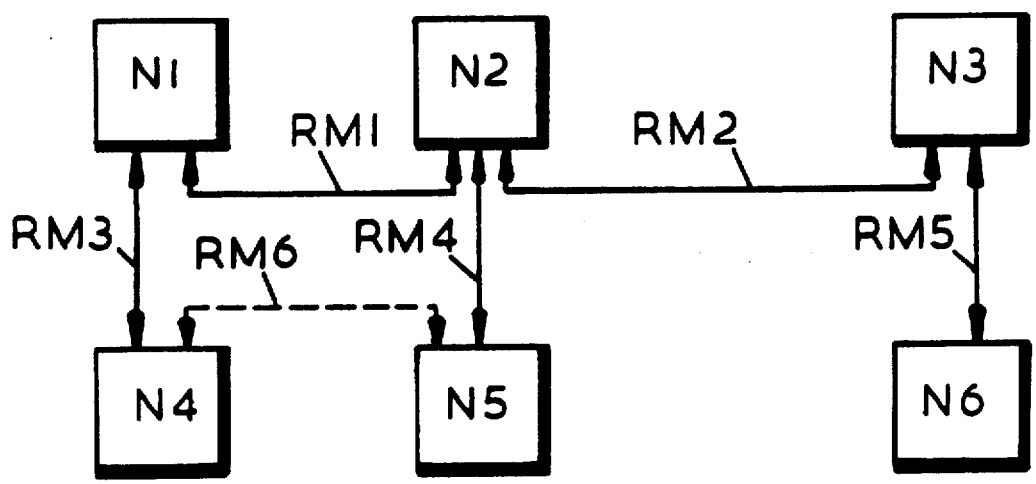

FIGS. 5 to 7 schematically illustrate three system configurations that are possible with the present invention. FIG. 5 shows the configuration of FIG. 2, that is a series of nodes N connected by a single reflected memory bus RM1. FIG. 6 shows a configuration similar to that of FIG. 5 but with parallel reflected memory buses RM1 and RM2. In such an arrangement the system would normally operate using bus RM1 with bus RM2 idle, but in the event of damage to bus RM1 the system could switch substantially immediately to bus RM2. By monitoring the condition of the buses and routing RM1 and RM2 separately a failsafe/self healing arrangement can be achieved. Further system security could be obtained by duplicating the processing nodes themselves with one normally operating and the other on hot standby, each of the pair of nodes being connected to both the buses RM1 and RM2.

In the arrangements of FIGS. 5 and 6 each reflected memory bus is connected to each node so that the two nodes that are farthest apart must be no further apart than the carry range of the bus, typically forty feet at 26.6 MB/Sec. In some circumstances it is highly desirable to be able to locate nodes at a greater distance apart than this, e.g. in shipboard fire control systems where one seeks to retain system operability even if a node is totally destroyed and to widely distribute the nodes so that localised damage cannot disable a significant number of nodes. FIG. 7 illustrates an arrangement in accordance with the invention which enables the distance between closest adjacent nodes to be equal to the maximum carry range of the reflected memory bus.

In the arrangement of FIG. 7, a series of six nodes N1 to N6 are arranged effectively in five pairs N1 N2, N2 N3, N1 N4, N2 N5 and N3 N6 with each pair operating in accordance with the procedures described above with reference to FIG. 2. The pairs of nodes are linked by respective reflected memory buses RM1 to RM5. Each node has a memory partitioned into local and shared data sections, but the shared data section is further partitioned into sub-sections each dedicated to a respective reflected memory bus. Thus each node has a shared data section, but that of node N1 is divided into two sub-sections, that of node N2 is divided into three sub-sections, and that of node N4 is not subdivided. Each sub-section of the shared memory has its own read sense circuit equivalent to components 27 to 33 of FIG. 4.

Assuming that node N1 generates data to be shared, then that data has an address unique throughout the system to which only node N1 can write. Node N1 attempts to write that data into each of its shared memory sub-sections and is successful only if the address allocated to the data is within the range set by the address comparator of the read sense logic. Assuming the data is written to each of the sub-sections that data is then transferred to nodes N2 and N4. At node N2, software controls the transfer of the freshly written data in its own shared memory to nodes N3 and N5 by copying data from the memory sub-section devoted to memory bus RM1, into the memory sub-sections devoted to memory buses RM2 and RM4. A further transfer is arranged from node N3 to N6. Because each memory location can be written to by only one node, relatively simple procedures can be followed for transferring data between nodes. In the illustrated arrangement there is only one possible route for data between any two nodes. This need not be the case however. For example a further memory bus RM6 may be provided as shown by dotted lines between nodes N4 and N5. If data originating at node N1 was to be written in the shared memory of node N5 the software could be arranged to transfer the data via RM1 and RM4, or, if that failed, to alternatively select the route RM3 and RM6. All that is required is a software routine controlling the sub-sections of the shared data memories to which the data is written.

Figure 8:
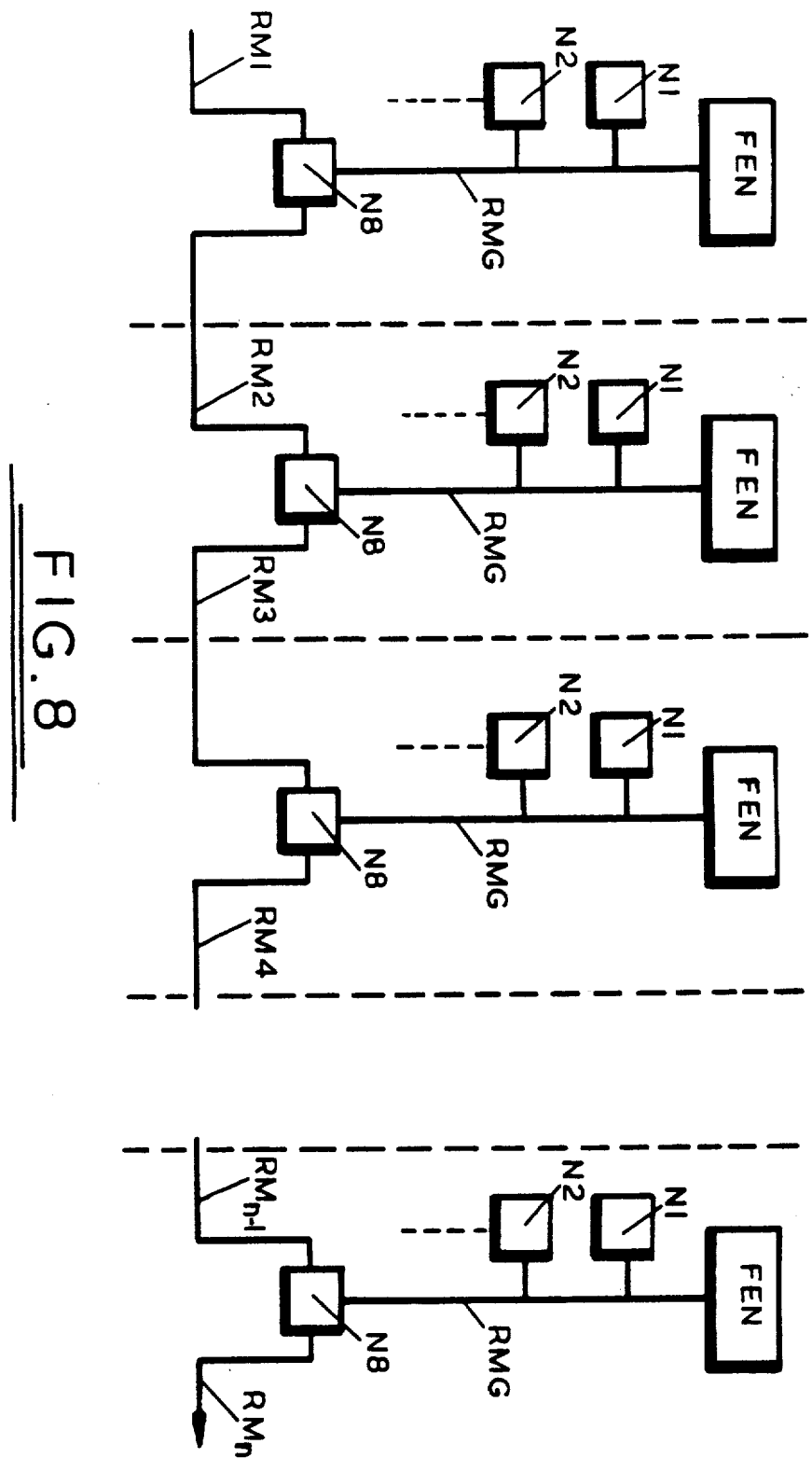

The arrangement of FIG. 8 is similar to that of FIG. 7 except that rather than having single nodes interconnected in pairs by respective reflected memory buses the nodes are interconnected in groups each containing nine nodes and these groups are in turn interconnected in pairs by further reflected memory buses connected to only one node within each group. As shown in FIG. 8, each group comprises a front end processor node FEN similar to that including processing unit 13 in FIG. 2 interconnected by a reflected memory bus RMG to eight further nodes N1 to N8 similar to those including processing units 11 in FIG. 2. The nodes N8 are connected in pairs by reflected memory buses RM1 to RMn and operate as "software exchanges" in the same manner as is the case with the node N2 in FIG. 7.

Figure 9:
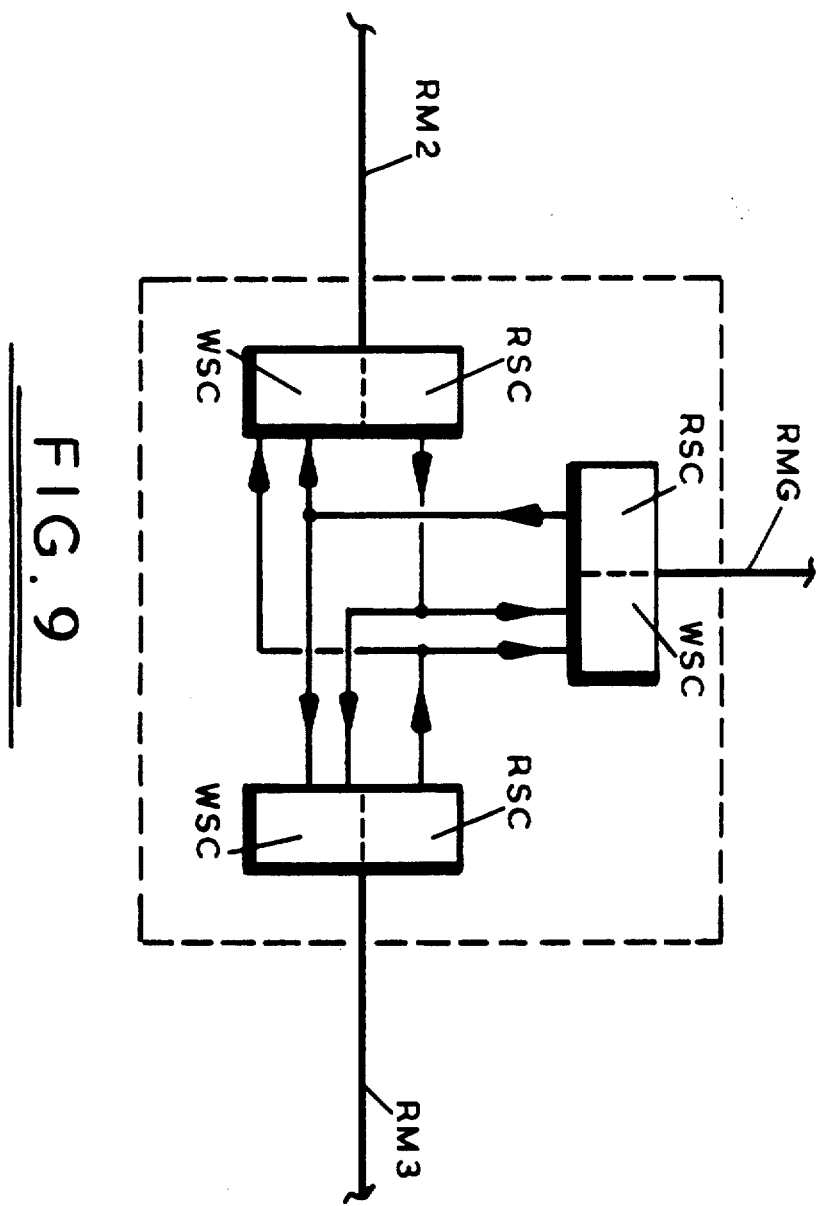

The "software exchanges" between different reflected memory buses introduce some delays in the transfer of data between the buses. FIG. 9 illustrates a "repeater" arrangement designed to replace the "software exchange" and thereby provide an automatic hardware connection which speeds up data transfer.

Referring to FIG. 9, the illustrated repeater replaces the node N8 between buses RM2 and RM3 and comprises three sets of read/write sense hardware similar to the read/write sense hardware 17 of FIGS. 2 and 4. Each set comprises a read sense circuit RSC and a write sense circuit WSC for each port to which a reflected memory bus is connected, each read sense circuit communicating data to the write sense circuits of the other two ports. Each port has its own partitioned address the range of which is set to limit the transfer of data between buses to that which is required. Thus the repeater reacts in exactly the same way as the other nodes on the buses to which it is connected and data transferred to a reflected memory bus by a repeater is handled in exactly the same way as data generated by any other node on that bus. Data is buffered through the repeater by FIFO circuits to control bus access as with a normal node. There is no software overhead involved in data transfers between buses, and traffic on the buses is limited to that which is essential by selecting the range of addresses for which data can be transferred by each read/write sense circuit. Thus the system operates at a high speed making it easier to use relatively low data rate buses with a long carry range.

The repeater facilitates the provision of a hot standby system which is kept fully updated so that it can be switched in at once in the event of a failure. The repeater itself could be duplicated.

I claim:

1. A real-time data processing system, comprising at least two processing nodes, a local data store in respect of each processing node, each local data store being partitioned into sections a first one of which is reserved for the storage of non-shared data local to the respective processing node and a second one of which is reserved for the storage of data to be shared between processing nodes, a data link interconnecting the processing nodes, generating means at each processing node for generating a read/write message including an address and data to be written to that address whenever that processing node writes to an address in the second section of the local data store, transmitting means for transmitting each generated write message via the data link to each of the processing nodes, allocating means for allocating to each address in the second sections of the local data stores a respective processing node which is to be a master processing node for that address, preventing means for preventing data being written to any address in the second section of a local data store other than by the allocated master processing node, said allocating an preventing means including an address range comparator in respect of each processing node for comparing the address of a data write message generated by that processing node with a preset range of addresses and for transferring the data write message to the data link only if the compared address is within the preset range, each processing node including a latch into which each data write message is loaded, a first in first out register connected to the output of the latch, a detector for detecting a successful writing of data to the data store local to the processing node, an AND gate connected to the detector and address range comparator and controlling the latch such that the content of the latch is transferred to the register when the compared address is within range and successful writing of data is detected, and a transmitter connected to the register for transmitting messages stored in the register over the data link.

2. A real-time data processing system, comprising at least two processing nodes, a local data store in respect of each processing node, each local data store being partitioned into sections a first one of which is reserved for the storage of non-shared data local to the respective processing node and a second one of which is reserved for the storage of data to be shared between processing nodes, a data link interconnecting the processing nodes, generating means at each processing node for generating a read/write message including an address and data to be written to that address whenever that processing node writes to an address in the second section of the local data store, transmitting means for transmitting each generated write message via the data link to each of the processing nodes, allocating means for allocating to each address in the second sections of the local data stores a respective processing node which is to be a master processing node for that address, preventing means for preventing data being written to any address in the second section of a local data store other that by the allocated master processing node, said allocating and preventing means including an address comparator in respect of each processing node for comparing the address of a data write message received from the data link with a preset range of addresses and for transferring the received data write message to the local store only is the compared address is within the preset range of addresses, one of the processing nodes controlling traffic on the data link, and each other processing node including allocating data link access means for allocating data link access to the said other processing nodes one at a time in response to access requests from the request logic, applying means for applying a clock signal to the data link each time a processing node is granted access thereto, checking means for checking the validity of messages transmitted on the data link, applying means for applying a data valid signal to the data link if a checked message is valid, and preventing data means at each processing node for preventing data contained in transmitted messages from being transferred to the local data store until receipt of the data valid signal.

3. A real-time data processing system, comprising at least two processing nodes, a local data store in respect of each processing node, each local data store being partitioned into sections a first one of which is reserved for the storage of non-shared data local to the respective processing node and a second one of which is reserved for the storage of data to be shared between processing nodes, a data link interconnecting the processing nodes, generating means at each processing node for generating a read/write message including an address and data to be written to that address whenever that processing node writes to an address in the second section of the local data store, transmitting means for transmitting each generated write message via the data link to each of the processing nodes, allocating means for allocating to each address in the second sections of the local data stores a respective processing node which is to be a master processing node for that address, preventing means for preventing data being written to any address in the second section of a local data store other that by the allocated master processing node, and two reflected memory data links connected in parallel to the processing nodes to accept shared data therefrom.

4. A real-time data processing system, comprising at least two processing nodes, a local data store in respect of each processing node, each local data store being partitioned into sections a first one of which is reserved for the storage of non-shared data local to the respective processing node and a second one of which is reserved for the storage of data to be shared between processing nodes, a data link interconnecting the processing nodes, generating means at each processing node for generating a read/write message including an address and data to be written to that address whenever that processing node writes to an address in the second section of the local data store, transmitting means for transmitting each generated write message via the data link to each of the processing nodes, allocating means for allocating to each address in the second sections of the local data stores a respective processing node which is to be a master processing node for that address, preventing means for preventing data being written to any address in the second section of a local data store other than by the allocated master processing node, a plurality of groups of processing nodes with the processing nodes in each group being connected in parallel by a respective data link and at least one of the processing nodes belonging to two of the groups, wherein the said second section of the data store of the said at least one processing node is divided into a plurality of subsections each of which receives data to be shared with the processing nodes of a respective group of processing nodes, and controlling means are provided for controlling the transfer of data from one subsection to the other when data is to be shared between two groups of processing nodes.

5. A real-time data processing system, comprising at least two processing nodes, a local data store in respect of each processing node, each local data store being partitioned into sections a first one of which is reserved for the storage of non-shared data local to the respective processing node and a second one of which is reserved for the storage of data to be shared between processing nodes, a data link interconnecting the processing nodes, generating means at each processing node for generating a read/write message including an address and data to be written to that address whenever that processing node writes to an address in the second section of the local data store, transmitting means for transmitting each generated write message via the data link to each of the processing nodes, allocating means for allocating to each address in the second sections of the local data stores a respective processing node which is to be a master processing node for that address, preventing means for preventing data being written to any address in the second section of a local data store other than by the allocated master processing node, two groups of processing nodes each interconnected by a respective data link and a repeater connected to each data link, the repeater including read/write sense hardware in respect of each data link for transferring messages having a first selected range of addresses from a first reflected memory data link to a second reflected memory data link and for transferring messages having a second selected range of addresses from the second data link to the first data link.

6. The combination of a processing node and a data link, said processing node located in a processing system interconnected to other processing units through the data link, said processing node comprising:

a memory having a first data port and a second data port and having a set of addresses;

processing means connected to said first data port of said memory for reading data from said memory and for writing data into said memory;

sense logic means connected to said processing means, said second data port of said memory and the data link for sensing write data being written into preselected addresses of said memory, forwarding said sensed write data directly into said data link for reflection into the memories of other processing units interconnected through the data link and for receiving data from said data link, said sense logic means including (i) sensing means for sensing a write transfer being written into said memory, (ii) first setting means for setting a first predetermined range of memory addresses in said sense logic means, (iii) first comparing means for comparing a sensed write transfer to determine if said sensed write transfer is being written to an address within said first predetermined range of memory addresses, (iv) first queuing means for receiving from said first comparing means and queuing sensed write transfers that are written to addresses within said first predetermined range of memory addresses, and (v) transmitter means for transmitting queued sensed write transfers from said first queuing means onto said data link independently of said processing means, (vi) receiver means for sensing a write transfer on the data link, (vii) second setting means for setting a second predetermined range of memory addresses in said sense logic means, (viii) second comparing means for comparing a sensed write transfer sensed by said receiver means to determine if said sensed write transfer is written to an address within said second predetermined range of memory addresses, (ix) loading means for receiving from said receiver means and loading sensed write transfers, and (x) second queuing means for receiving from said loading means and queuing sensed write transfers that are written to addresses with said second predetermined range of memory addresses as determined by said second comparing means and releasing them into the second port of the memory independently of said processing means.

7. In a system in which memories of processing nodes are linked, said system including a data link and processing nodes interconnected to other processing nodes through the data link, each processing node comprising:

a memory having a first data port and a second data port;

processing means connected to said first data port of said memory for reading data from said memory and for writing data into said memory;

sense logic means connected to said processing means, said second data port of said memory and the data link for sensing write data being written into said memory, forwarding said sensed write data directly into said data link for reflection into the memories of other processing nodes interconnected through the data link and for receiving data from said data link, said sense logic means including (i) sensing means for sensing a write transfer being written into said memory, (ii) first setting means for setting a first predetermined range of memory addresses in said sense logic means, (iii) first comparing means for comparing a sensed write transfer to determine if said sensed write transfer is being written to an address within said first predetermined range of memory addresses, (iv) first queuing means for receiving from said first comparing means and queuing sensed write transfers that are written to addresses within said first predetermined range of memory addresses, and (v) transmitter means for transmitting queued sensed write transfers from said first queuing means onto said data link independently of said processing means, (vi) receiver means for sensing a write transfer on the data link, (vii) second setting means for setting a second predetermined range of memory addresses in said sense logic means, (viii) second comparing means for comparing a sensed write transfer sensed by said receiver means to determine if said sensed write transfer is written to an address within said second predetermined range of memory addresses, (ix) loading means for receiving from said receiver means and loading sensed write transfers, and (x) second queuing means for receiving from said loading means and queuing sensed write transfers that are written to addresses within said second predetermined range of memory addresses as determined by said second comparing means and releasing them into the second port of the memory independently of the processing means.

8. The combination of a processing node and a data link, said processing node located in a processing system interconnected to other processing units through the data link, said processing node comprising:

a memory having at least one data port;

processing means connected to the data port of said memory for reading data from said memory and for writing data into said memory;

write sense logic means connected to said processing means and the data link for detecting write data being written into said memory and forwarding detected write data having preselected addresses directly into said data link for reflection into the other processing units interconnected through the data link, said write sense logic means including (i) sensing means for sensing a write transfer being written to said memory, (ii) first setting means for setting a first predetermined range of memory addresses in said write sense logic means, (iii) first comparing means for comparing a sensed write transfer to determine if said sensed write transfer is being written to an address within said first predetermined range of memory addresses, (iv) first queuing means for receiving from said first comparing means and queuing sensed write transfers that are written to addresses within said first predetermined range of memory addresses, and (v) transmitter means for transmitting queued sensed write transfers from said first queuing means onto said data link independently of said processing means.

9. The combination according to claim 8, wherein said memory includes a second data port connected to said write sense logic means to receive data from said data link and wherein said write sense logic means further includes (i) receiver means for sensing a write transfer on the data link, (ii) second setting means for setting a second predetermined range of memory addresses in said write sense logic means, (iii) second comparing means for comparing a sensed write transfer sensed by said receiver means to determine if said sensed write transfer is written to an address within said second predetermined range of memory addresses, (iv) loading means for receiving from said receiver means and loading sensed write transfers, and (v) second queuing means for receiving from said loading means and queuing sensed write transfers that are written to addresses within said second predetermined range of memory addresses as determined by said second comparing means and releasing them into the second data port of the memory of said processing node independently of the processing means of said processing node.

10. In combination: processing node located in a processing system interconnected to other processing units through a data link, said processing node including: a memory having at least two data ports and having a set of addresses, processing means connected to one data port of said memory for reading data from said memory and for writing data into said memory and write sense logic means connected to said processing means and the other data port of said memory for sensing write data being written into preselected addresses of said memory, for forwarding said sensed write data via said data link to other processing units interconnected through the data link and for passing data on said data link to said other port of said memory, said write sense logic means including (i) sensing means for sensing a write transfer being written to said memory, (ii) first setting means for setting a first predetermined range of memory addresses in said write sense logic means, (iii) first comparing means for comparing a sensed write transfer to determine if said sensed write transfer is being written to an address within said first predetermined range of memory addresses, (iv) first queuing means for receiving from said first comparing means and queuing sensed write transfers that are written to addresses with said first predetermined range of memory addresses, and (v) transmitter means for transmitting queued sensed write transfers form said first queuing means onto said data link independently of said processing means of said processing node.

11. The combination according to claim 10, wherein said write sense logic means includes read sense logic means for sensing data on said data link and forwarding data having predetermined addresses to said memory via said second data port, said read sense logic means including (i) receiver means for sensing a write transfer on the data link, (ii) second setting means for setting a second predetermined range of memory addresses in said read sensing logic means, (iii) second comparing means for comparing a sensed write transfer sensed by said receiver means to determine if said sensed write transfer is written to an address within said second predetermined range of memory addresses, (iv) loading means for receiving from said receiver means and loading sensed write transfers, and (v) second queuing means for receiving from said loading means and queuing sensed write transfers that are written to addresses within said second predetermined range of memory addresses as determined by said second comparing means and releasing them into the second data port of the memory of said processing node independently of the processing means of said processing node.

12. A data processing system including a plurality of processing nodes comprising:

a reflective data link means for transferring write only data between the processing nodes; and at least one processing node including a memory having two data ports, a processor connected to one port of said memory and a read/write sense logic means connected to the other port of said memory, said read/write sense logic means also connected to said processor and said reflective data link means, said read/write sense logic means sensing data from said processor and forwarding data having a predetermined set of addresses to said reflective data link means an passing data from said reflective data link means to said other port of said memory, said read/write sense logic means including (i) sensing means for sensing a write transfer from said processor, (ii) first setting means for setting a first predetermined range of memory addresses in said read/write sense logic means, (iii) first comparing means for comparing a sensed write transfer to determine if said sensed write transfer is being written to an address within said first predetermined range of memory addresses, (iv) first queuing means for receiving from said first comparing means and queuing sensed write transfers that are written to addresses within said first predetermined range of memory addresses, and (v) transmitter means for transmitting queued sensed write transfers from said first queuing means onto said reflective data link means independently of said processor of said at least one processing node, (vi) receiver means for sensing a write transfer on the reflective data link means, (vii) second setting means for setting a second predetermined range of memory addresses in said read/write sense logic means, (viii) second comparing means for comparing a sensed write transfer sensed by said receiver means to determine if said sensed write transfer is written to an address within said second predetermined range of memory addresses, (ix) loading means for receiving from said receiver means and loading sensed write transfers, and (x) second queuing means for receiving from said loading means and queuing sensed write transfers that are written to addresses within said second predetermined range of memory addresses as determined by said second comparing means an releasing them into the second data port of the memory of said at least one processing node independently of the processor of said at least one processing node.

13. The data processing system according to claim 12 wherein at least one said processor includes a computing means that is master of a portion of said predetermined set of data addresses wherein data for said portion of said predetermined set of data addresses can only be written by said computing means.

14. The data processing system according to claim 12 also including a second reflective data link means connected in parallel to said reflective data link means.

15. The data processing system according to claim 12 wherein said processing nodes are connected via said reflective data link means such that data may be reflected from a first unit to a second unit through a third unit and through a fourth unit.

16. The data processing system according to claim 12 wherein said processing units are connected via said reflective data link such that data may be reflected from a first unit to a second unit only through a third unit.

17. The data processing system according to claim 12 wherein said processing units are connected via said reflective data link means such that data may be reflected from a first unit to a second unit and to a third unit simultaneously.

18. A processing system comprising: a first processing node; a second processing node; and a reflective data link connected between said first processing node and said second processing node for transferring data therebetween;

said first processing node having a first processor, a first dual data port memory and a first read/write sense logic means, said first processing node processing data and writing processed data into one port of said first dual data port memory, said processed data being in one of a local category and a shared category, said first read/write sense logic means connected to said first processor for discriminating between local category data and shared category data, said first read/write sense logic means including (i) first sensing means for sensing a write from said first processor into said one port of said first dual data port memory, (ii) first discriminating means for determining if said sensed write is being written to a first predetermined range of memory addresses, (iii) first transmitting means for transmitting onto said reflective data link a sensed write being written to an address within said predetermined range of memory addresses.

(iv) first receiver means for sensing a write on the reflective data link and (v) second discriminating means for determining if said write sensed by said first receiver means is being written to a second predetermined range of memory addresses, and responsive thereto for releasing same into the second port of said first dual data port memory, said second processing node having a second processor, a second dual data port memory and a second read/write sense logic means, said second processing node processing data and writing processed data into one port of said second dual data port memory, said processed data being in one of a local category and a shared category, said second read/write sense logic means connected to said second processor for discriminating between local category data and shared category data, said second read/write sense logic means including (i) a second sensing means for sensing a write from said second processor into said one port of said second dual data port memory, (ii) third discriminating means for determining if said sensed write is being written to a third predetermined range of memory addresses, (iii) second transmitting means for transmitting onto said reflective data link a sensed write being written to an address within said third predetermined range of memory addresses, (iv) a second receiver means for sensing a write on the reflective data link and (v) fourth discriminating means for determining if said write sensed by said second receiver means is being written to a fourth predetermined range of memory addresses and responsive thereto for releasing same into the second port of said second dual data port memory.

19. The processing system according to claim 18 also including a second reflective data link connected between said first processing node and said second processing node for transferring data therebetween.

20. The processing system according to claim 18 also including:

a third processing node having a third processor, a third dual data port memory and a third read/write sense logic means, said third processing node processing data and writing processed data into one port of said third dual data port memory, said processed data being in one of a local category and a shared category, said third read/write sense logic means connected to said third processor for discriminating between local category data and shared category data, said third read/write sense logic means including (i) third sensing means for sensing a write from said third processor into said one port of said third dual data port memory, (ii) fifth discriminating means for determining if said sensed write is being written to a fifth predetermined range of memory addresses, (iii) third transmitting means for transmitting onto said reflective data link a sensed write being written to an address within said fifth predetermined range of memory addresses, (iv) third receiver means for sensing a write on the reflective data link and (v) sixth discriminating means for determining if said write sensed by said third receiver means is being written to a second predetermined range of memory addresses, and responsive thereto for releasing same into the second port of said third dual data port memory;

a fourth processing node having a fourth processor, a fourth dual data port memory and a fourth read/write sense logic means, said fourth processing node processing data and writing processed data into one port of said fourth memory, said processed data being in one of a local category and a shared category, said fourth read/write sense logic means connected to said fourth processor for discriminating between local category data and shared category data, said fourth read/write sense logic means including (i) a fourth sensing means for sensing a write from said fourth processor into said one port of said fourth dual data port memory, (ii) seventh discriminating means for determining if said sensed write is being written to a seventh predetermined range of memory addresses, (iii) fourth transmitting means for transmitting onto said reflective data link a sensed write being written to an address within said seventh predetermined range of memory addresses, (iv) a fourth receiver means for sensing a write on the reflective data link and (v) eighth discriminating means for determining if said write sensed by said fourth receiver means is being written to an eighth predetermined range of memory addresses and responsive thereto for releasing same into the second port of said fourth dual data port memory;

a second reflective data link connected between said first processing node and said third processing node for transferring data therebetween;

a third reflective data link connected between said second processing node and said fourth processing node for transferring data therebetween; and a fourth reflective data link connected between said third processing node and said fourth processing node for transferring data therebetween.

21. A real-time data processing system comprising a plurality of processing nodes and write only reflective data link means for transferring information containing writes only between the plurality of processing nodes, I. each processing node including:
  a. bus means for carrying information,
  b. bus means for processing information connected to the bus means an including means for putting a write transfer on the bus means, and
  c. memory means for storing information having a port connected to the bus means an including means for accepting through its port a write transfer on the bus means as transferred from the processing means, II. at least one processing node having:
  a. write sense logic means connected to the bus means for sensing a write transfer on the bus means intended for the memory means and for forwarding it onto the write only reflective data link means without any intervention of the processing means, said write sense logic means including
    (i) sensing means for sensing a write transfer on the bus means,
    (ii) first setting means for setting a first predetermined range of memory addresses in said write sensing logic means,
    (iii) first comparing means for comparing a sensed write transfer to determine if said sensed write transfer is being written to an address within said first predetermined range of memory addresses,
    (iv) first queuing means for receiving from said first comparing means and queuing sensed write transfers that are written to addresses within said first predetermined range of memory addresses, and (v) transmitter means for transmitting queued sensed write transfers from said first queuing means onto said reflective data link means independently of said processing means of said one processing node, III. at least one other processing node including:
  a. its memory means having a second port; and
  b. read sense logic means for sensing a write transfer on the write only reflective data link means and for transferring same into the second port of the memory means of said other processing node without intervention of the processing means of either the one or other processing nodes, said read sense logic means including
    (i) receiver means for sensing a write transfer on the write only reflective data link means,
    (ii) second setting means for setting a second predetermined range of memory addresses in said read sensing logic means,
    (iii) second comparing means for comparing a sensed write transfer sensed by said receiver means to determine if said sensed write transfer is written to an address within said second predetermined range of memory addresses,
    (iv) loading means for receiving from said receiver means and loading sensed write transfers, and
    (v) second queuing means for receiving from said loading means and queuing sensed write transfers that are written to addresses within said second predetermined range of memory addresses as determined by said second comparing means and releasing them into the second port of the memory means of said other processing node independently of the processing means of said other processing node.

22. A real-time data processing system as defined in claim 21, wherein all processing nodes are provided with memory means having a second port, write sense logic means and read sense logic means.

23. A real-time data processing system as defined in claim 22, wherein each memory means is partitioned into a local section and a shared section and said write sense logic means forwards a sensed write transfer to the write only reflective data link means only if it is written to an address in said shared section.

24. A real-time data processing system according to claim 23, wherein each node has its own unique address partition in its memory means so that only one node is capable of writing data to any one address in the shared data sections of the memory means.

25. A real-time data processing system as defined in claim 22, wherein all setting means are capable of being independently set.

26. A real-time data processing system as defined in claim 22, wherein the write only reflective data link means is a bus.

27. A real-time data processing system as defined in claim 22, wherein the first predetermined range of memory addresses is independently predetermined for each said write sense logic means.

28. A real-time data processing system as defined in claim 22, wherein the second predetermined range of memory addresses is independently predetermined for each said read sense logic means.

29. A real-time data processing system as defined in claim 22, wherein the first and second predetermined ranges of memory addresses are each independently predetermined for each said write sense logic means and said read sense logic means.

30. A real-time data processing system according to claim 23, wherein at least one node has its own unique address partition in its memory means so that only said at least one node is capable of writing data to preselected memory addresses in the shared data sections of the memory means.

31. A real-time data processing system as defined in claim 21, wherein each memory means is partitioned into a local section and a shared section and said write sense logic means of said at least one processing node forwards a sensed write transfer to the write only reflective data link means only if it is written to an address in the shared section of the memory means of said at least one processing node.

32. A real-time data processing system according to claim 31, wherein each node has its own unique address partition in its memory means so that only one node is capable of writing data to any one address in the shared data sections of the memory means.

33. A real-time data processing system according to claim 31, wherein at least one node has its own unique address partition in its memory means so that only said at least one node is capable of writing data to preselected memory addresses in the shared data sections of the memory means.

34. A real-time data processing system as defined in claim 21, wherein both the one and the other processing nodes have two ported memory means and are provided with write sense logic means and read sense logic means.

35. A real-time data processing system as defined in claim 34, wherein the first and second predetermined ranges of memory addresses are each independently predetermined for each said write sense logic means and said read sense logic means.

36. A real-time data processing system as defined in claim 21, wherein both the one and the other processing nodes have two ported memory means and are provided with write sense logic means and read sense logic means.

37. A real-time data processing system as defined in claim 36, wherein the predetermined range of addresses is independently selectable for each write sense logic means, and wherein the predetermined range of addresses is independently selectable for each said read sense logic means.

38. A real-time data processing system as defined in claim 21, wherein said first and second setting means are each capable of being independently set.

39. A real-time data processing system as defined in claim 21, wherein the write only reflective data link means is a bus.

40. A real-time data processing system as defined in claim 21, wherein the first predetermined range of memory addresses is independently predetermined for each said write sense logic means.

41. A real-time data processing system as defined in claim 21, wherein the second predetermined range of memory addresses is independently predetermined for each said read sense logic means.

42. The combination of a processing node and a data link, said processing node located in a processing system interconnected to other processing units through the data link, said processing node comprising:
  a memory having a first data port and a second data port and having a set of addresses;

processing means connected to said first data port of said memory for reading data from said memory and for writing data into said memory;

sense logic means connected to said processing means, said second data port of said memory and the data link for sensing write data being written into preselected addresses of said memory, forwarding said sensed write data directly into said data link for reflection into the memories of other processing units interconnected through the data link and for receiving data from said data link, said sense logic means including (i) sensing means for sensing a write from said processing means into said one port of said memory, (ii) first discriminating means for determining if said sensed write is being written to a first predetermined range of memory addresses, (iii) transmitting means for transmitting onto said reflective data link a sensed write being written to an address in said first predetermined range of memory addresses, (iv) receiver means for sensing a write on the reflective data link and (v) second discriminating means for determining if said write sensed by said receiver means is being written to a second predetermined range of memory addresses, and for releasing same into the second port of said memory responsive thereto.

43. A data processing system including a plurality of processing nodes and further comprising:

a reflective data link means for transferring write only data between the processing nodes; and at least one processing node including a memory having two data ports, a processor connected to one port of said memory and a read/write sense logic means connected to the other port of said memory, said read/write sense logic means also connected to said processor and said reflective data link means, said read/write sense logic means sensing data from said processor and forwarding data having a predetermined set of addresses to said reflective data link means and passing data from said reflective data link means to said other port of said memory, said read/write sense logic means including (i) sensing means for sensing a write from said processor into said one port of said memory, (ii) first discriminating means for determining if said sensed write is being written to a first predetermined range of memory addresses, (iii) transmitting means for transmitting onto said reflective data link means a sensed write being written to an address in said first predetermined range of memory addresses, (iv) receiver means for sensing a write on the reflective data link means and (v) second discriminating means for determining if said write sensed by said receiver means is being written to a second predetermined range of memory addresses, and for releasing same into the second port of said memory responsive thereto.

44. The data processing system according to claim 43 wherein at least one said processing node includes a computing means that is master of a portion of said predetermined set of addresses wherein data for said portion of said predetermined set of addresses can only be written by said computing means.

45. A real-time data processing system comprising a plurality of processing nodes and write only reflective data link means for transferring information containing writes only between the plurality of processing nodes, I. each processing node including:
   a. bus means for carrying information,
   b. processing means for processing information connected to the bus means and including means for putting a write transfer on the bus means, and
   c. memory means for storing information having a port connected to the bus means and including means for accepting through its port a write transfer on the bus means as transferred from the processing means;

II. at least one processing node having:
   a. write sense logic means connected to the bus means for sensing a write transfer on the bus means intended for the memory means and for forwarding it onto the write only reflective data link means without any intervention of the processing means, said write sense logic means including
      (i) sensing means for sensing a write transfer from said processing means into said one port of said memory means of said one processing node,
      (ii) first discriminating means for determining if said sensed write transfer is being written to a first predetermined range of memory addresses,
      (iii) transmitting means for transmitting onto said reflective data link means a sensed write transfer being written to an address within said first predetermined range of memory addresses;

III. at least one other processing node including:
   a. its memory means having a second port; and
   b. read sense logic means for sensing a write transfer on the write only reflective data link means and for transferring same into the second port of the memory means of said other processing node without intervention of the processing means of either the one or other processing nodes, said read sense logic means including
      (i) receiver means for sensing a write transfer on the reflective data link means, and
      (ii) second discriminating means for determining if said write transfer sensed by said receiver means is being written to a second predetermined range of memory addresses, and responsive thereto for releasing same into the second port of said memory means of said other processing node.

46. A real-time data processing system comprising a plurality of processing nodes and write only reflective data link means for transferring information containing writes only between the plurality of processing nodes, each processing node including:

a. bus means for carrying information,
b. processing means for processing information connected to the bus means and including means for putting a write transfer on the bus means, and
c. dual ported memory means for storing information having one port connected to the bus means and including means for accepting through its one port a write transfer on the bus means as transferred from the processing means, d. write sense logic means connected to the bus means for sensing a write transfer on the bus means intended for the memory means and for forwarding it onto the write only reflective data link means without any intervention of the processing means, said write sense logic means including
   (i) a sensing means for sensing a write transfer from said processor into said one port of said memory means,
   (ii) first discriminating means for determining if said sensed write transfer is being written to a first predetermined range of memory addresses, and
   (iii) transmitting means for transmitting onto said reflective data link means a sensed write transfer being written to an address in said first predetermined range of memory addresses, and
e. read sense logic means for sensing a write transfer on the write only reflective data link means and for transferring same into the second port of the memory means without intervention of the processing means, said read sense logic including
   (i) a receiver means for sensing a write transfer on the reflective data link means and
   (ii) second discriminating means for determining if said write transfer sensed by said receiver means is being written to a second predetermined range of memory addresses and responsive thereto for releasing same into the second port of said memory means.

* * * * *